US011959049B2

(12) United States Patent
De Jonge

(10) Patent No.: US 11,959,049 B2
(45) Date of Patent: Apr. 16, 2024

(54) AQUEOUS CLEANING COMPOSITIONS AND THE USE THEREOF

(71) Applicant: GUARD IT SOLUTIONS PTY LTD., Victoria (AU)

(72) Inventor: Richard De Jonge, Victoria (AU)

(73) Assignee: GUARD IT SOLUTIONS PTY LTD., Victoria (AU)

(*) Notice: Subject to any disclaimer, the term of this patent is extended or adjusted under 35 U.S.C. 154(b) by 734 days.

(21) Appl. No.: 17/058,121

(22) PCT Filed: May 23, 2019

(86) PCT No.: PCT/AU2019/050506

§ 371 (c)(1),
(2) Date: Nov. 23, 2020

(87) PCT Pub. No.: WO2019/222808

PCT Pub. Date: Nov. 28, 2019

(65) Prior Publication Data

US 2021/0198595 A1 Jul. 1, 2021

(30) Foreign Application Priority Data

May 24, 2018 (AU) ................................ 2018901814

(51) Int. Cl.

| | |
|---|---|
| ***C11D 1/62*** | (2006.01) |
| ***B08B 3/04*** | (2006.01) |
| ***C11D 1/72*** | (2006.01) |
| ***C11D 3/08*** | (2006.01) |
| ***C11D 3/20*** | (2006.01) |
| ***C11D 3/32*** | (2006.01) |
| ***C11D 11/00*** | (2006.01) |

(52) U.S. Cl.
CPC .................. *C11D 3/08* (2013.01); *C11D 1/62* (2013.01); *C11D 3/2003* (2013.01); *C11D 3/323* (2013.01); *C11D 11/0052* (2013.01)

(58) Field of Classification Search
CPC .... C11D 1/62; C11D 1/72; C11D 3/08; C11D 3/1246; C11D 3/323; C11D 7/3272; C11D 11/0052; B08B 3/04
See application file for complete search history.

(56) References Cited

U.S. PATENT DOCUMENTS

| | | | |
|---|---|---|---|
| 6,605,584 | B2 | 8/2003 | Fong et al. |
| 7,754,671 | B2 | 7/2010 | Lin et al. |
| 8,455,426 | B1 | 6/2013 | Shell et al. |
| 9,214,659 | B2 | 12/2015 | Horpel et al. |

(Continued)

FOREIGN PATENT DOCUMENTS

| | | | | |
|---|---|---|---|---|
| WO | 2017205915 A1 | | 12/2017 | |
| WO | WO 2017/205915 | * | 12/2017 | ............ C11D 1/835 |

OTHER PUBLICATIONS

International Search Report and Written Opinion from International Application No. PT/AU2019/050506, dated Jul. 31, 2019, 11 pages.

(Continued)

*Primary Examiner* — Brian P Mruk
(74) *Attorney, Agent, or Firm* — Norton Rose Fullbright US LLP

(57) ABSTRACT

The present invention broadly relates to aqueous cleaning compositions and the use thereof in cleaning soiled surfaces.

20 Claims, 4 Drawing Sheets

(56) References Cited

U.S. PATENT DOCUMENTS

| | | | |
|---|---|---|---|
| 11,261,405 B2 * | 3/2022 | De Jonge ............... | C11D 1/835 |
| 2004/0014622 A1 | 1/2004 | Becker | |
| 2010/0022437 A1 | 1/2010 | Artiga-Gonzales et al. | |
| 2013/0065971 A1 | 3/2013 | Rose, Sr. et al. | |
| 2015/0011453 A1 | 1/2015 | Bennett et al. | |

OTHER PUBLICATIONS

Evonik, "Textile Auxiliaries: Preparation and Softening Agents", [retrieved from the Internet on Nov. 23, 2020] <URL: https://www.textile-auxiliaries.com/product/textileauxiliaries/en/products/preparation-softening-agents/> published on Mar. 13, 2018 as per Wayback Machine, 2 pages.

Henkel, "Technical Information Rodine 85" [retrieved from the Internet on Nov. 23, 2020] >URL: http://www.telfordindustries.com.au/product/bonderite-s-ad-85-acheson-known-rodine-85/> published on May 27, 1996, 3 pages.

* cited by examiner

AQUEOUS CLEANING COMPOSITIONS AND THE USE THEREOF

CROSS-REFERENCE TO RELATED APPLICATIONS

The present application is a U.S. National Stage patent application of International Patent Application No. PCT/AU2019/050506, filed on May 23, 2019, which claims the benefit of Australian Patent Application No. 2018901814, filed on May 24, 2018, the benefit of which is claimed and the disclosures of which are incorporated herein by reference in their entireties.

FIELD OF THE INVENTION

The present invention broadly relates to aqueous cleaning compositions and the use thereof in cleaning soiled surfaces.

BACKGROUND OF THE INVENTION

The use of cleaning compositions is ubiquitous across a wide range of industries. However, many traditional cleaning products often include components that damage surfaces, contaminate waste water and/or are toxic to humans. Against this background, the present inventors have developed non-toxic, biodegradable cleaning compositions that offer a number of significant advantages over comparative less environmentally friendly compositions, whilst maintaining efficacy

SUMMARY OF THE INVENTION

In a first aspect the present invention provides a water-based cleaning composition comprising:

(i) a silicate;

(ii) an ethoxylated alcohol;

(iii) a quaternary fatty amine ethoxylate;

(iv) formaldehyde polymer with o-toluidinium chloride; and (v) a urea salt.

The silicate may be present in the composition in an amount between about 0.05% and about 10% by weight.

The ethoxylated alcohol may be present in the composition in an amount between about 0.5% and about 20% by weight.

The quaternary fatty amine ethoxylate may be present in the composition in an amount between about 0.1% and about 20% by weight.

The formaldehyde polymer with o-toluidinium chloride may be present in the composition in an amount between about 0.001% and about 20% by weight.

The formaldehyde polymer with o-toluidinium chloride may be present in the composition in an amount between about 0.001% and about 15% by weight.

The formaldehyde polymer with o-toluidinium chloride may be present in the composition in an amount between about 0.001% and about 10% by weight.

The urea salt may be present in the composition in an amount between about 1% and about 60% by weight.

The composition may comprise water in an amount between about 30% and about 70% by weight, or in amount between about 45% and about 70% by weight.

The silicate may be an alkali metal silicate. In some embodiments the silicate is a metasilicate.

The ethoxylated alcohol may be a $C_9$-$C_{11}$ ethoxylated alcohol.

The $C_9$-$C_{11}$ ethoxylated alcohol may have an average of about 2 to 10 moles of ethylene oxide per mole of alcohol, or an average of about 4 to 8 moles of ethylene oxide per mole of alcohol.

The quaternary fatty amine ethoxylate may have the following general formula (I):

(I)

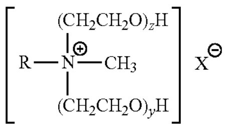

wherein:

R is a $C_4$-$C_{24}$ alkyl group;

z and y are independently selected from an integer between 1 and 20; and

X is a counter ion.

The composition may further comprise butoxyethanol, for example 2-butoxyethanol.

The butoxyethanol may be present in the composition in an amount between about 0.05% and 10% by weight.

The composition may further comprise alkyl esters of one or more soybean oil fatty acids.

The alkyl esters of the one or more soybean oil fatty acids may be $C_1$-$C_{20}$ alkyl esters or mixtures thereof, $C_1$-$C_{10}$ alkyl esters or mixtures thereof, $C_1$-$C_4$ alkyl esters or mixtures thereof, or methyl esters.

The alkyl esters of the one or more soybean oil fatty acids may be present in the composition in an amount between about 0.01% and 3% by weight.

The composition may further comprise thiourea.

The thiourea may be present in the composition in an amount between about 0.0001% and 1% by weight.

The composition may further comprise ethylene glycol.

The ethylene glycol may be present in the composition in an amount between about 0.0001% and 1% by weight.

The composition may further comprise a quaternary aryl ammonium chloride.

The quaternary aryl ammonium chloride may be present in the composition in an amount between about 0.0001% and 1% by weight.

In a second aspect the present invention provides a method for cleaning a soiled surface comprising: contacting the soiled surface with the composition of the first aspect, and rinsing the surface with water.

The soiled surface may be brick, stone or concrete. The brick may be a clay brick. The stone may be natural stone. The concrete may be concrete blocks or concrete pavers.

The method may further comprise agitating the surface to which the composition has been applied.

The surface may be soiled with one or more of mortar, oil, grease, grime, dirt, bacteria, mould, mildue, carbon residue, cement residue, lichen, funghi (such as black spot) and organic stains.

In some embodiments the solied surface may be brick, stone or concrete that is soiled with mortar or cement residue. The brick may be clay brick. The stone may be natural stone. The concrete may be concrete blocks or concrete pavers.

Definitions

The following are some definitions that may be helpful in understanding the description of the present invention.

These are intended as general definitions and should in no way limit the scope of the present invention to those terms alone, but are put forth for a better understanding of the following description.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps. Thus, in the context of this specification, the term "comprising" means "including principally, but not necessarily solely".

In the context of this specification the term "about" is understood to refer to a range of numbers that a person of skill in the art would consider equivalent to the recited value in the context of achieving the same function or result.

In the context of this specification the terms "a" and "an" are used herein to refer to one or to more than one (i.e to at least one) of the grammatical object of the article. By way of example, "an element" means one element or more than one element.

In the context of this specification the term "quaternary fatty amine ethoxylate" refers to a quaternary ammonium compound that is ethoxylated one or more times and further comprises a hydrocarbon chain (fatty alkyl chain) of at least about 4, 5, 6, 7, 8 or more carbons.

In the context of this specification, the term "alkyl" is taken to mean straight chain or branched chain monovalent saturated hydrocarbon groups having the recited number of carbon atoms. Examples of alkyl groups include, but are not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, 2-ethylpentyl, 3-ethylpentyl, heptyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 5-methylheptyl, 1-methylheptyl, octyl, nonyl, dodecyl and the like.

In the context of the present specification, the term "water-based" means that water is a, or the, major component of the composition.

In the context of the present specification, the term "substantially free" is understood to mean less than about 10%, or less than about 8%, or less than about 5%, or less than about 4%, or less than about 3%, or less than about 2%, or less than about 1%, or less than about 0.5%, or less than about 0.01%, or less than about 0.005%, or less than about 0.001%, or less than about 0.0001% of the recited component by weight in the composition.

In the context of the present specification, the term "readily biodegradable" means that 60% to 70% of the composition to which it refers is able to be degraded or broken down in a natural environmental within 28 days.

DETAILED DESCRIPTION OF THE INVENTION

Figure 1:
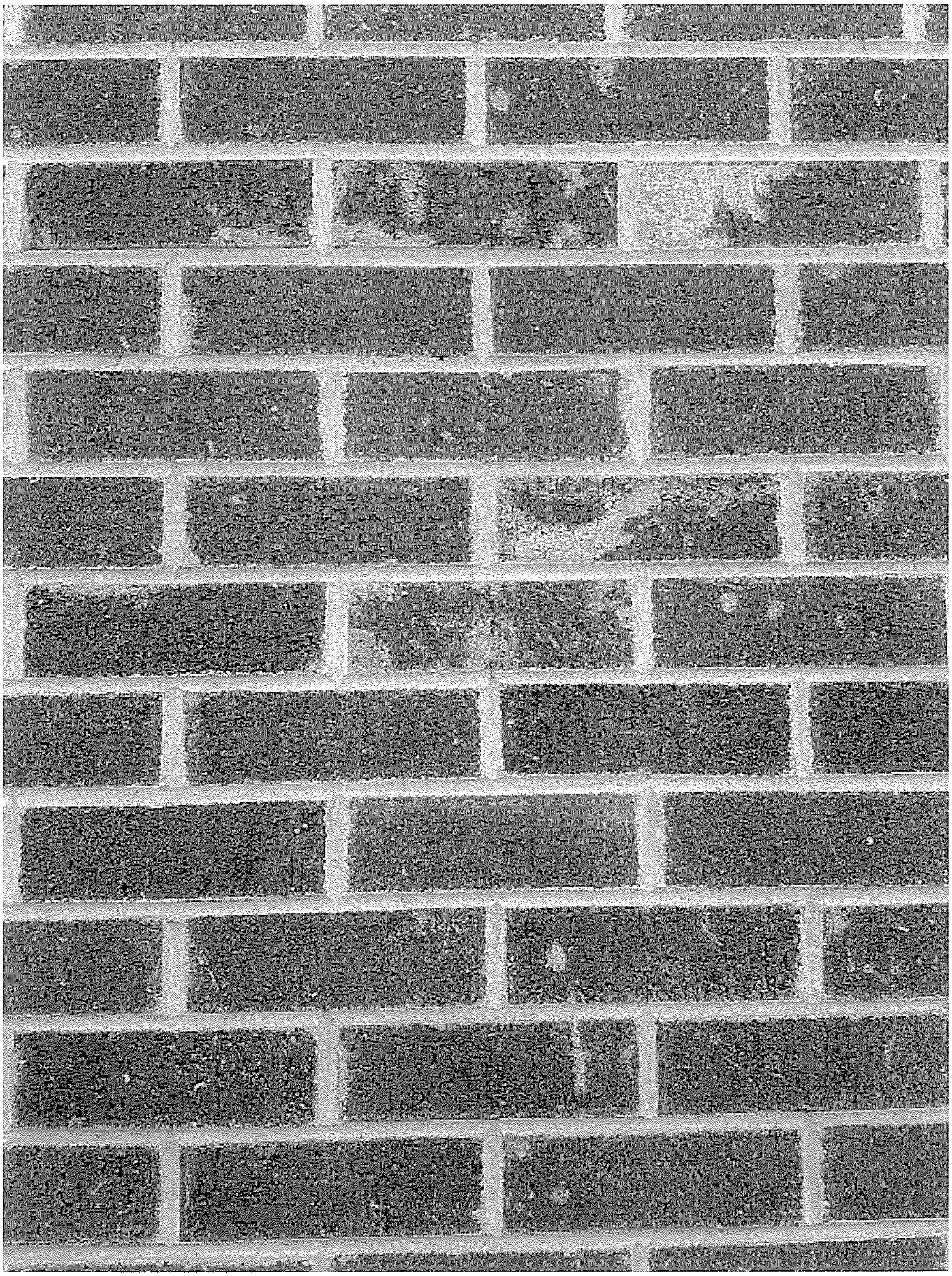
FIG. 1 shows bricks with mortar stains prior to being cleaned.
Figure 2:
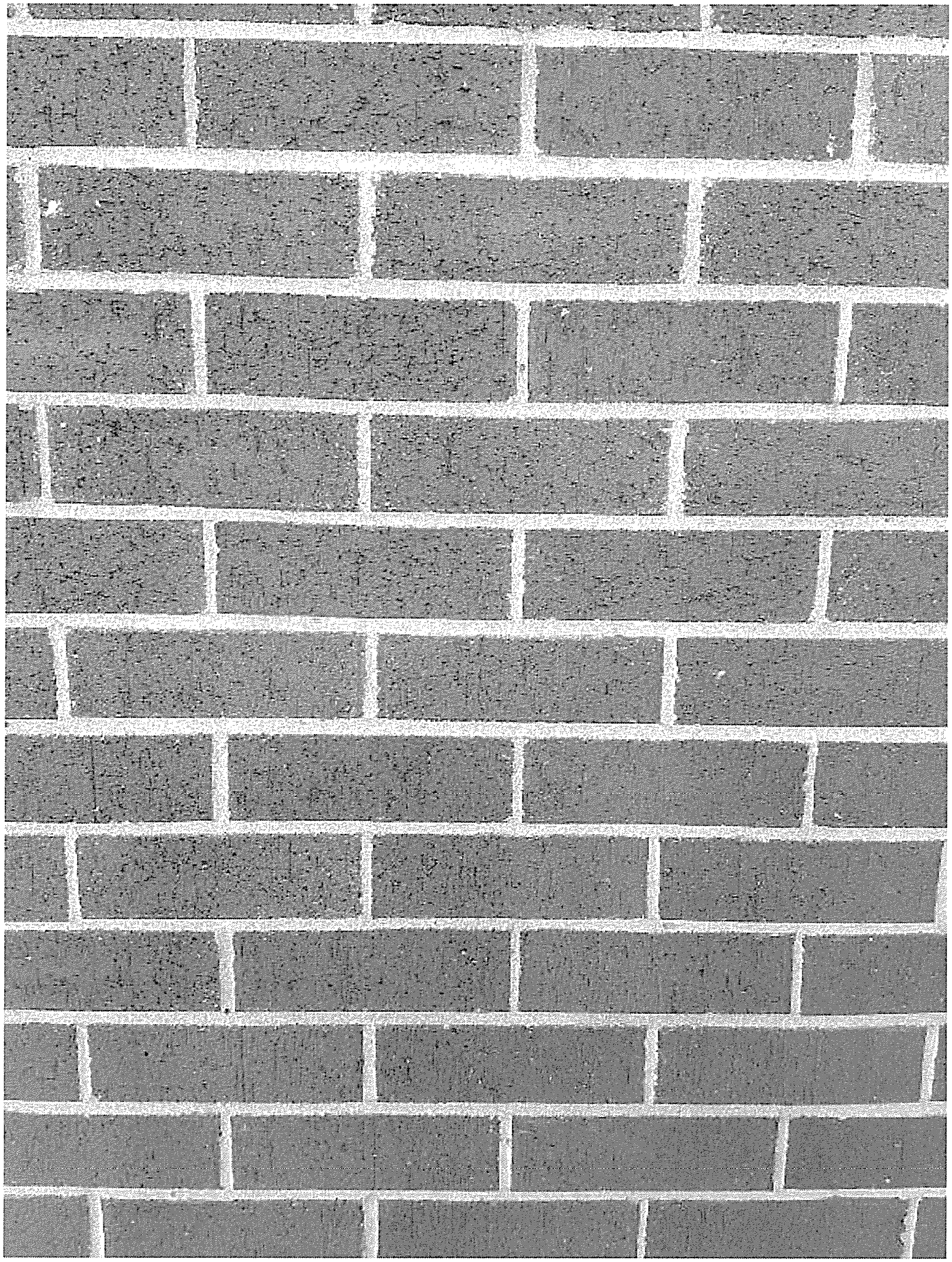
FIG. 2 shows the bricks of FIG. 1 after having been cleaned with a composition of the invention. Note that there is no damage to the bricks or the mortar.
Figure 3:
FIG. 3 shows the bricks of FIG. 1 after having been cleaned with hydrochloric acid. Note the pitting of the mortar and the damage to the brick surface.
Figure 4:
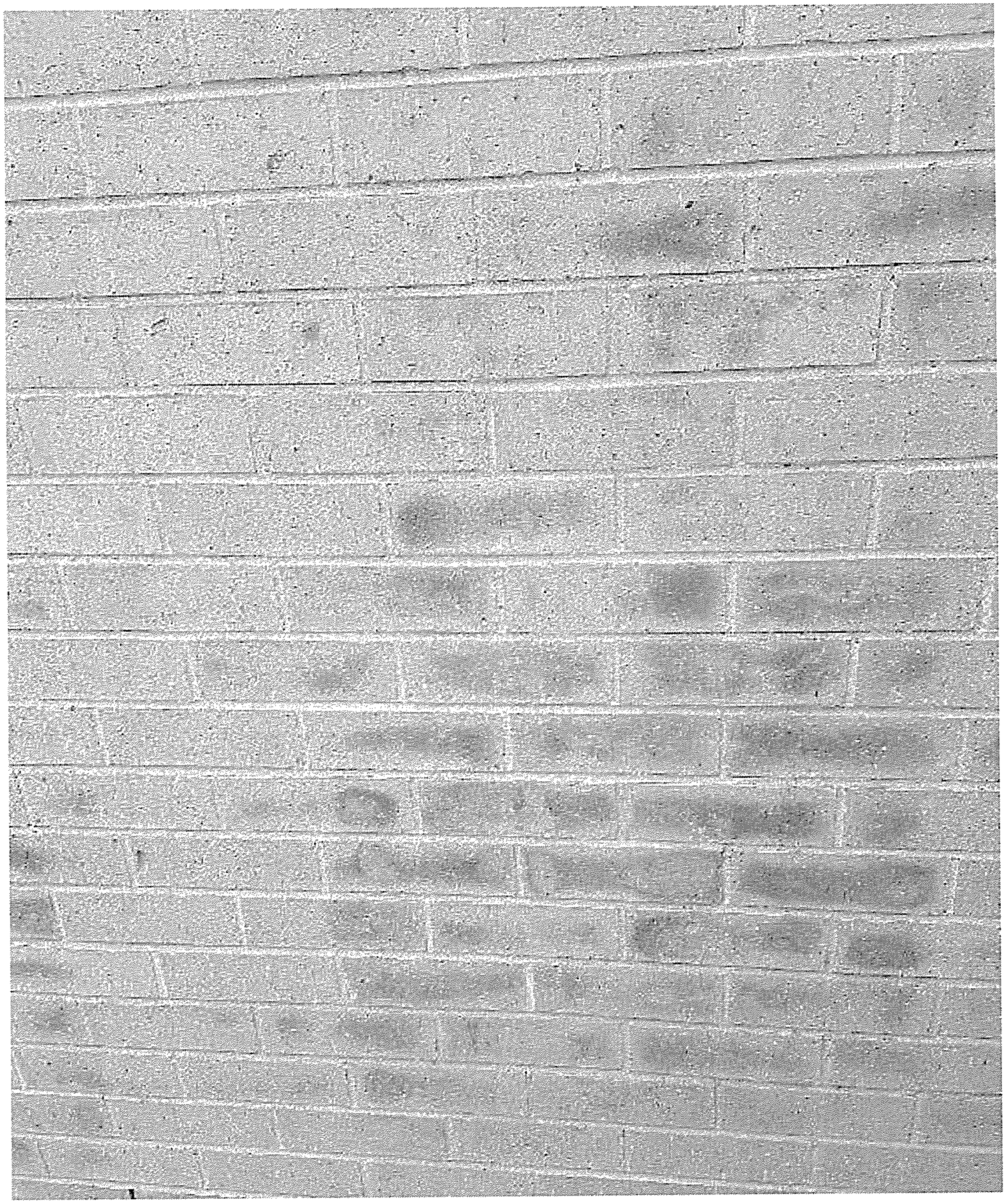
FIG. 4 shows vanadium stains on bricks following cleaning with hydrochloric acid.

In one aspect the present invention provides a water-based cleaning composition comprising:

(i) a silicate;

(ii) an ethoxylated alcohol;

(iii) a quaternary fatty amine ethoxylate;

(iv) formaldehyde polymer with o-toluidinium chloride; and (v) a urea salt.

The compositions find use in cleaning, and more particularly in removing mortar, oil, grease, grime, dirt, bacteria, mould, mildue, carbon residue, cement residue, lichen, funghi (such as black spot), organic stains and the like, from surfaces. Typically the surface is an external surface and may be porous or non-porous. Non-limiting examples of surfaces include: brick, rendered surfaces, terracotta, bluestone, timber, metal, rubber, colorbond, concrete, sandstone and other masonry surfaces, stone block work either natural or man made. In some embodiments the surface is concrete, pavers or tiles. In other embodiments, the surface is brick, concrete or stone. The brick may be a clay brick, and the stone may be natural stone. The concrete may be concrete blocks or concrete pavers. In some embodiments the solied surface may be brick, stone or concrete that is soiled with mortar or cement residue.

Currently, bricks and other surfaces, such as cement and stone, are typically cleaned using hydrochloric acid. The inventor has found that the compositions of the invention offer significant advantages over hydrochloric acid in the cleaning of bricks, cement and natural stone. For example, unlike hydrochloric acid, the compositions of the invention do not burn bricks, pit mortar joints or affect the integrity of the mortar. Hydrochloric acid requires neutralization so as to prevent erosion and damage to the mortar even after the surface is rinsed with water. The compositions of the present invention do not require neutralization. New bricks may also be stained with vanadium salts, the staining being exacerbated by application of hydrochloric acid. The compositions of the invention do not worsen vanadium stains. Unlike hydrochloric acid, the compositions of the invention do not produce toxic fumes and are non-toxic to plants. In the case of concrete pavers, hydrochloric acid will etch the paver causing damage and exposing the aggregate within the concrete. The compositions of the invention will not etch the paver, nor expose the aggregate. When used on bluestone, hydrochloric acid causes a rust stain on the surface. In the case of sandstone, hydrochloric acid leads to bleaching of the colour and damage to the stone. Furthermore, hydrochloric acid damages metal substrates on buildings when used for cleaning bricks. The compositions of the invention do not suffer from any of these problems. The inventor has also found that the compositions are at least, if not more, efficacious than hydrochloric acid in the cleaning of bricks, concrete and natural stone.

The compositions are non-toxic, non-flammable, non-carcinogenic, readily biodegradable and may be free, or substantially free, of caustic compounds, hydrochloric acid, hydrofluoric acid, sulfuric acid, nitric acid, VOCs, chlorinated solvents and phosphates.

In some embodiments the silicate is an alkali metal silicate. In alternative embodiments the silicate is a metasilicate, for example sodium metasilicate, barium metasilicate or calcium metasilicate.

The silicate may be present in the composition in an amount between about 0.05% and about 10% by weight, or in an amount between about 0.05% and about 5% by weight, or in an amount between about 0.05% and about 3% by weight, or in an amount between about 0.1% and about 3% by weight.

Typically the ethoxylated alcohol is a $C_9$-$C_{11}$ ethoxylated alcohol. In some embodiments the $C_9$-$C_{11}$ ethoxylated alcohol has an average of about 2 to 10 moles of ethylene oxide per mole of alcohol. In other embodiments the $C_9$-$C_{11}$ ethoxylated alcohol has an average of about 3 to 9 moles of ethylene oxide per mole of alcohol. In yet further embodiments the $C_9$-$C_{11}$ ethoxylated alcohol has an average of about 4 to 8 moles of ethylene oxide oxide per mole of alcohol.

$C_9$-$C_{11}$ ethoxylated alcohols may be prepared from the corresponding primary alcohols by reaction with ethylene oxide utilising methods well known to those skilled in the art. $C_9$-$C_{11}$ ethoxylated alcohols are also commercially available from a range of sources under the following trade names: Berol® 260, Berol 260®, C9-11 Pareth-6, Tomadol 91-6 and Rhodasurf91-6, to name just a few.

The ethoxylated alcohol may be present in the composition in an amount between about 0.5% and about 25% by weight, or in an amount between about 0.5% and about 20% by weight, or in an amount between about 0.5% and about 15% by weight.

In some embodiments, the quaternary fatty amine ethoxylate has the following general formula (I):

(I)

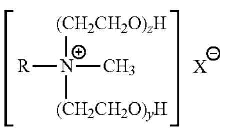

wherein:

R is a $C_4$-$C_{24}$ alkyl group;

z and y are independently selected from an integer between 1 and 20; and

X is a counter ion, for example chloride, bromide, methosulfate and the like.

In alternative embodiments R is a $C_8$-$C_{24}$ alkyl group and z and y are independently selected from an integer between 1 and 10. In still a further embodiment R is a $C_{10}$-$C_{20}$ alkyl group or a $C_{12}$-$C_{18}$ alkyl group and z and y are independently selected from an integer between 1 and 10, 1 and 8, 1 and 6, 1 and 4 or 1 and 3. In another embodiment R is a $C_{10}$-$C_{20}$ alkyl group or a $C_{12}$-$C_{18}$ alkyl group and z and y are independently 1 or 2. In yet another embodiment R is a coco alkyl group and z and y are independently 1 or 2. The compound of formula (I) may be coco alkylbis(hydroxyethyl)methyl, ethoxylated, Me sulfates (salts) (CAS No. 68989-03-7), which is commercially available under the following trade names: Ecoeng 500, Ethoquad C 25MS, Rewoquat CPEM, Tego IL-K 5M and Tego IL-K 5MS.

The quaternary fatty amine ethoxylate may be present in the composition in an amount between about 0.1% and about 20% by weight, or in an amount between about 0.1% and about 15% by weight, or in an amount between about 0.1% and about 10% by weight.

The formaldehyde polymer with o-toluidinium chloride (CAS No. 68492-82-0) may be present in the composition in an amount between about 0.001% and about 20% by weight, or in an amount between about 0.001% and about 15% by weight, or in an amount between about 0.001% and about 10% by weight, or in an amount between about 0.001% and about 6% by weight, or in an amount between about 0.01% and about 3% by weight, or in an amount between about 0.01% and about 1% by weight.

In some embodiments, the formaldehyde polymer with o-toluidinium chloride may be provided by adding to the composition the product sold under the trade name RODINE 85 by Henkel USA.

Examples of suitable urea salts include acid addition salts, such as for example urea hydrochloride, urea hydrobromide, urea hydroiodide, urea sulfate, urea perchloride, urea nitrate and the like, and combinations thereof.

The urea salt may be present in the composition in an amount between about 1% and about 60% by weight, or in an amount between about 2% and about 50% by weight, or in an amount between about 5% and about 45% by weight.

In some embodiments the composition comprises alkyl esters of one or more soybean oil fatty acids. Typically, the composition comprises alkyl esters of a plurality of soybean oil fatty acids. The major fatty acids present in soybean oil (as triglycerides) are linolenic acid, linoleic acid, oleic acid, stearic acid and palmitic acid. Accordingly, in one embodiment, the composition comprises alkyl esters of linolenic acid, linoleic acid, stearic acid, oleic acid and palmitic acid. The amounts of these esters as a weight percentage of the total amount of soybean oil fatty acid esters in the composition may be as follows:

| Ester type | Amount |
|---|---|
| Linolenic | 5-15% |
| Linoleic | 40-60% |
| Oleic | 20-40% |
| Stearic | 1-8% |
| Palmitic | 5-15% |

The alkyl esters of one or more soybean oil fatty acids may be $C_1$-$C_{20}$ alkyl esters or mixtures thereof, $C_1$-$C_{10}$ alkyl esters or mixtures thereof, $C_1$-$C_6$ alkyl esters or mixtures thereof, $C_1$-$C_4$ alkyl esters or mixtures thereof, or methyl esters.

Soybean oil methyl esters (methyl soyate) are commercially available from Stepan Company, Vertec BioSolvents and Cargill Inc. Those skilled in the art will readily be able to prepare alkyl esters of soybean oil fatty acids by transesterification of soybean oil with an appropriate alcohol, for example methanol.

The alkyl esters of the one or more soybean oil fatty acids may be present in the composition in an amount between about 0.01% and 3% by weight, or in an amount between about 0.01% and 2% by weight, or in an amount between about 0.01% and 1% by weight.

The butoxyethanol may be present in the composition in an amount between about 0.05% and 10% by weight, or in an amount between about 0.1% and 5% by weight, or in an amount between about 0.5% and 5% by weight.

The thiourea may be present in the composition in an amount between about 0.0001% and about 1% by weight, or in an amount between about 0.0001% and about 0.5% by weight, or in an amount between about 0.0005% and about 0.1% by weight, or in an amount between about 0.008% and about 0.04% by weight.

The ethyleneglycol may be present in the composition in an amount between about 0.0001% and about 0.5% by weight, or in an amount between about 0.0005% and about 0.1% by weight, or in an amount between about 0.008% and about 0.04% by weight.

The quaternary aryl ammonium chloride may be present in the composition in an amount between about 0.0001% and about 0.5% by weight, or in an amount between about 0.0005% and about 0.1% by weight, or in an amount between about 0.008% and about 0.04% by weight.

In some embodiments the composition further comprises a thickening agent in an amount effective to modify the viscosity of the composition such that the composition will not flow when applied to a surface. Thickening agents are well known to those skilled in the art. Thickening agents that may be used in the compositions of the invention include, but are not limited to algae extracts, gums, starches, pectins, hydrolysed proteins, cellulose and derivatives thereof, polymers, copolymers, parrafin and clays. Algae extracts that may be used include, but are not limited to alginates and carrageenans. Hydrolysed proteins include, but are not limited to gelatin. Cellulose derivatives that may be used include cellulose ethers such as, for example, methylcellulose, ethylcellulose, hydroxypropylmethylcellulose and hydroxyethylcellulose. Cellulose ethers are commercially available from Dow Chemical under the trade name METHOCEL®.

The amount of thickening agent present in the composition will depend on the particular thickening agent being used. Typically, the thickening agent is present in the composition in an amount between about 0.05% and about 10% by weight, or in an amount between about 0.05% and about 5% by weight, or in an amount between about 0.05% and about 2% by weight, or in an amount between about 0.05% and about 1.5% by weight.

In one embodiment the composition comprises:

(i) a silicate in an amount between about 0.1% and 5% by weight;
(ii) a $C_9$-$C_{11}$ ethoxylated alcohol in an amount between about 0.5% and 20% by weight;
(iii) a quaternary fatty amine ethoxylate in an amount between about 0.1% and 10% by weight;
(iv) formaldehyde polymer with o-toluidinium chloride in an amount between about 0.01% and 5% by weight.
(v) a urea salt in an amount between about 2% and 50% by weight; and
(vi) water in an amount between about 45% and 70% by weight.

In another embodiment the composition comprises:

(i) a silicate in an amount between about 0.1% and 3% by weight;
(ii) a $C_9$-$C_{11}$ ethoxylated alcohol in an amount between about 1.5% and 15% by weight;
(iii) a quaternary fatty amine ethoxylate in an amount between about 0.5% and 10% by weight;
(iv) formaldehyde polymer with o-toluidinium chloride in an amount between about 0.01% and 5% by weight.
(v) a urea salt in an amount between about 5% and 45% by weight; and
(vi) water in an amount between about 45% and 70% by weight.

In yet another embodiment the composition comprises:

(i) a silicate in an amount between about 0.1% and 4% by weight;
(ii) butoxy ethanol in an amount between about 0.1% and 6% by weight;
(iii) alkyl esters of one or more soybean oil fatty acids in an amount between about 0.01% and 1% by weight;
(iv) a $C_9$-$C_{11}$ ethoxylated alcohol in an amount between about 0.5% and 18% by weight;
(v) a quaternary fatty amine ethoxylate in an amount between about 0.1% and 10% by weight;
(vi) formaldehyde polymer with o-toluidinium chloride in an amount between about 0.01% and 2.5% by weight.
(vii) a urea salt in an amount between about 2% and 50% by weight; and
(viii) water in an amount between about 45% and 70% by weight.

In still a further embodiment the composition comprises:

(i) a silicate in an amount between about 0.3% and 3% by weight;
(ii) butoxy ethanol in an amount between about 0.5% and 5% by weight;
(iii) alkyl esters of one or more soybean oil fatty acids in an amount between about 0.05% and 0.5% by weight;
(iv) a $C_9$-$C_{11}$ ethoxylated alcohol in an amount between about 1% and 15% by weight;
(v) a quaternary fatty amine ethoxylate in an amount between about 0.5% and 10% by weight;
(vi) formaldehyde polymer with o-toluidinium chloride in an amount between about 0.01% and 1% by weight.
(vii) a urea salt in an amount between about 5% and 45% by weight; and
(viii) water in an amount between about 50% and 70% by weight.

In the above embodiments the quaternary fatty amine ethoxylate may be of the formula (I). In the above embodiments the quaternary fatty amine ethoxylate may be coco alkylbis(hydroxyethyl)methyl, ethoxylated, Me sulfates (salts) (CAS No. 68989-03-7). The compositions may, if desired, comprise additional components and/or additives as long as such components or additives do not adversely affect the properties of the composition.

The compositions may be prepared by mixing the various components according to the weight percentages indicated. Following mixing, a homogeneous solution may be obtained. In some embodiments a mixture comprising the silicate, ethoxylated alcohol, formaldehyde polymer with o-toluidinium chloride and quaternary fatty amine ethoxylate in water may be prepared. The urea salt may then be added and the resulting mixture stirred until a homogenous solution is obtained. In an alternative embodiment a solution of the urea salt in water may be prepared. The silicate, ethoxylated alcohol, formaldehyde polymer with o-toluidinium chloride and quaternary fatty amine ethoxylate may then be added and the resulting mixture stirred until a homogenous solution is obtained. In other embodiments a homogeneous solution may be prepared comprising the silicate, ethoxylated alcohol, quaternary fatty amine ethoxylate and urea salt in water, to which is added the formaldehyde polymer with o-toluidinium chloride.

The pH of the composition may be between about 1 and about 4, or between about 1 and about 3, or between about 1 and about 2, or about 1.1.

Depending on the desired use, the compositions may be used neat or alternatively diluted to any desired concentration. For example, when used on bricks the composition may be diluted with 3 to 4 parts water, when used on concrete (such as for example concrete blocks) the composition may be diluted with 6 parts water and when used on stone the composition may be diluted with 10 parts water. In one embodiment the composition may be drawn from an auxillary source and metered into water or steam to give the desired dilution at the nozzle. Alternatively, application may be achieved using a venturi system which self-mixes the composition with water. Further alternatives involve application using a low pressure spray pump or, where the surface is horizontal, a watering can. The final concentration at which the composition is used will depend on a variety of factors, such as the mode of application, the temperature of the composition when applied, the dwell time of the composition on the surface, the nature and extent of soiling and the like. In some embodiments the composition is diluted with water, applied to the surface for a period of time sufficient to permit cleaning, and then washed off with water. The surface to which the composition has been applied may be agitated prior to the composition being washed off. The dwell time of the composition on the surface will depend on a number of factors, such as the type of surface and the nature and extent of the soiling. Typically, the dwell time will be between about 1 and 30 minutes, or between 5 and 20 minutes, or between about 2 and 10 minutes.

The compositions are highly versatile in that they are capable of removing a wide range of soiling from surfaces, for example oil, grease, grime, dirt, bacteria, mould, mildue, bacteria, cement residue, carbon residue, lichen, funghi (such as black spot) and organic stains.

Examples

The invention will now be described in more detail, by way of illustration only, with respect to the following examples. The examples are intended to serve to illustrate this invention and should not be construed as limiting the generality of the disclosure of the description throughout this specification.

In one embodiment, compositions of the invention may be prepared according to the following standard procedure:

1. Ensure mixing vessel is clean.
2. Add formulation quantity of water.
3. Add formulation quantity of silicate.
4. Add formulation quantity of ethoxylated alcohol.
5. Add formulation quantity of quaternary fatty amine ethoxylate.
6. Add formulation quantity of formaldehyde polymer with o-toluidinium chloride.
7. Add formulation quantity of other optional components.
8. Mix the resulting composition.
9. Add formulation quantity of urea salt.
10. Mix until a homogeneous composition is obtained.

In another embodiment, compositions of the invention may be prepared according to the following standard procedure:

1. Ensure mixing vessel is clean.
2. Add formulation quantity of water.
3. Add formulation quantity of silicate.
4. Add formulation quantity of ethoxylated alcohol.
5. Add formulation quantity of quaternary fatty amine ethoxylate.
6. Add formulation quantity of other optional components.
7. Mix the resulting composition.
8. Add formulation quantity of urea salt.
9. Add formulation quantity of formaldehyde polymer with o-toluidinium chloride.
10. Mix until a homogeneous composition is obtained.

The following compositions may be prepared in accordance with the invention. All percentages are w/w.

Composition 1

- Sodium metasilicate 3%
- $C_9$-$C_{11}$ ethoxylated alcohol 10%
- coco alkylbis(hydroxyethyl)methyl, ethoxylated, Me sulfates (salts) 7%
- formaldehyde polymer with o-toluidinium chloride 0.01-0.5%
- Urea HCl 15%
- Water to 100%

Composition 2

- Sodium metasilicate 0.5%
- $C_9$-$C_{11}$ ethoxylated alcohol 1.5%
- coco alkylbis(hydroxyethyl)methyl, ethoxylated, Me sulfates (salts) 1%
- formaldehyde polymer with o-toluidinium chloride 0.01-0.5%
- Urea HCl 45%
- Water to 100%

Composition 3

- Sodium metasilicate 2%
- $C_9$-$C_{11}$ ethoxylated alcohol 7.5%
- coco alkylbis(hydroxyethyl)methyl, ethoxylated, Me sulfates (salts) 4.5%
- formaldehyde polymer with o-toluidinium chloride 0.08-0.25%
- Urea HCl 25%
- Water to 100%

Composition 4

- Sodium metasilicate 3%
- $C_9$-$C_{11}$ ethoxylated alcohol 12%
- coco alkylbis(hydroxyethyl)methyl, ethoxylated, Me sulfates (salts) 7%
- formaldehyde polymer with o-toluidinium chloride 0.08-0.25%
- Urea HCl 5%
- Water to 100%

Composition 5

- Sodium metasilicate 2.1%
- Butoxy ethanol 3.5%
- Methyl soyate 0.35%
- $C_9$-$C_{11}$ ethoxylated alcohol 10.5%
- coco alkylbis(hydroxyethyl)methyl, ethoxylated, Me sulfates (salts) 6.3%
- formaldehyde polymer with o-toluidinium chloride 0.08-0.25%
- Urea HCl 15%
- Water to 100%

Composition 6

- Sodium metasilicate 0.3%
- Butoxy ethanol 0.5%
- Methyl soyate 0.05%
- $C_9$-$C_{11}$ ethoxylated alcohol 1.5%
- coco alkylbis(hydroxyethyl)methyl, ethoxylated, Me sulfates (salts) 0.9%
- formaldehyde polymer with o-toluidinium chloride 0.08-0.25%
- Urea HCl 45%
- Water to 100%

Composition 7

- Sodium metasilicate 1.5%
- Butoxy ethanol 2.5%
- Methyl soyate 0.25%
- $C_9$-$C_{11}$ ethoxylated alcohol 7.5%
- coco alkylbis(hydroxyethyl)methyl, ethoxylated, Me sulfates (salts) 4.5%
- formaldehyde polymer with o-toluidinium chloride 0.08-0.25%
- Urea HCl 25%

Water to 100%

Composition 8

Sodium metasilicate 2.7%

Butoxy ethanol 4.5%

Methyl soyate 0.45%

$C_9$-$C_{11}$ ethoxylated alcohol 13.5% coco alkylbis(hydroxyethyl)methyl, ethoxylated, Me sulfates (salts) 8.1% formaldehyde polymer with o-toluidinium chloride 0.08-0.25%

Urea HCl 5%

Water to 100%

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavor to which this specification relates.

It will be appreciated by those skilled in the art that numerous variations and/or modifications may be made to the invention without departing from the spirit or scope of the invention as broadly described. The present embodiments are therefore to be considered in all respects as illustrative and not restrictive.

The invention claimed is:

1. A water-based cleaning composition comprising:

(i) a silicate;

(ii) an ethoxylated alcohol;

(iii) a quaternary fatty amine ethoxylate;

(iv) formaldehyde polymer with o-toluidinium chloride; and (v) a urea salt.

2. The composition of claim 1, wherein the silicate is present in the composition in an amount between about 0.05% and about 10% by weight.

3. The composition of claim 1, wherein the ethoxylated alcohol is present in the composition in an amount between about 0.5% and about 20% by weight.

4. The composition of claim 1, wherein the quaternary fatty amine ethoxylate is present in the composition in an amount between about 0.1% and about 20% by weight.

5. The composition of claim 1, wherein the formaldehyde polymer with o-toluidinium chloride is present in the composition in an amount between about 0.001% and about 15% by weight.

6. The composition of claim 1, wherein the urea salt is present in the composition in an amount between about 1% and about 60% by weight.

7. The composition of claim 1, wherein water is present in the composition in an amount between about 30% and about 70% by weight.

8. The composition of claim 1, wherein the ethoxylated alcohol is a $C_9$-$C_{11}$ ethoxylated alcohol.

9. The composition of claim 1, wherein the quaternary fatty amine ethoxylate has the following general formula (I):

(I)

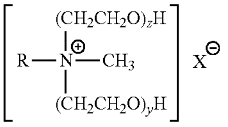

wherein:

R is a $C_4$-$C_{24}$ alkyl group;

z and y are independently selected from an integer between 1 and 20; and

X is a counter ion.

10. The composition of claim 9, wherein:

R is a $C_{10}$-$C_{20}$ alkyl group;

z and y are independently selected from an integer between 1 and 10; and

X is a counter ion.

11. The composition of claim 1, further comprising butoxyethanol.

12. The composition of claim 1, further comprising alkyl esters of one or more soybean oil fatty acids.

13. The composition of claim 12, wherein the alkyl esters of the one or more soybean oil fatty acids are present in the composition in an amount between about 0.01% and about 3% by weight.

14. The composition of claim 1, further comprising ethylene glycol.

15. The composition of claim 14, wherein the ethylene glycol is present in the composition in an amount between about 0.0001% and about 1% by weight.

16. The composition of claim 1, further comprising a quaternary aryl ammonium chloride.

17. A method for cleaning a soiled surface comprising: contacting the soiled surface with the composition of claim 1, and rinsing the surface with water.

18. The method of claim 17, further comprising agitating the surface to which the composition has been applied.

19. The method of claim 17, wherein the soiled surface is selected from the group consisting of: brick, stone and concrete.

20. The method of claim 19, wherein the brick is clay brick, the stone is natural stone and the concrete is concrete blocks or pavers.

* * * * *